Dec. 29, 1931.  H. R. McDERMOTT  1,838,952
LOADING SKIP
Filed May 7, 1928
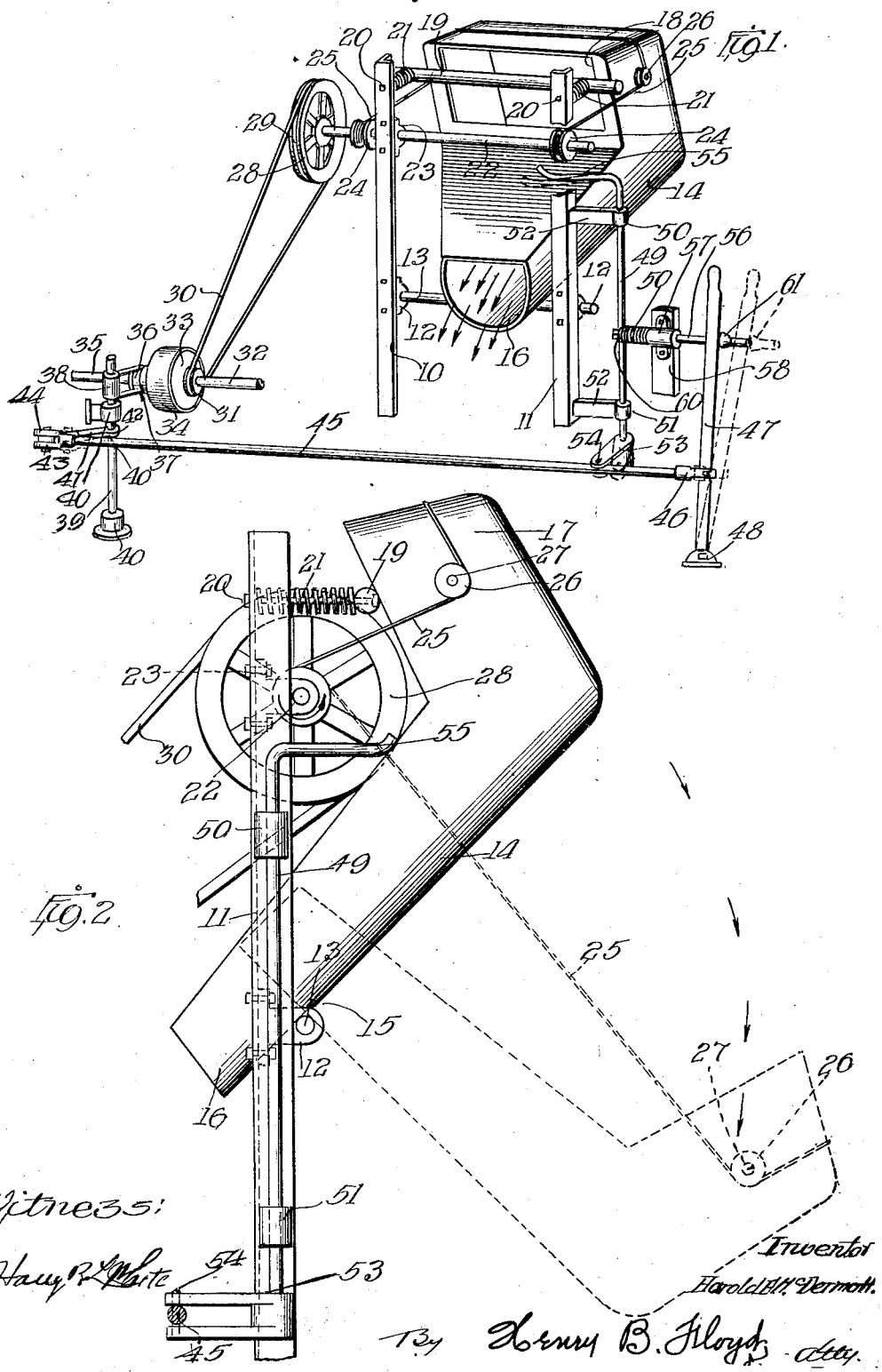

Patented Dec. 29, 1931

1,838,952

UNITED STATES PATENT OFFICE

HAROLD R. McDERMOTT, OF WATERLOO, IOWA

LOADING SKIP

Application filed May 7, 1928. Serial No. 275,585.

This invention relates to mixing machines and more particularly to improved loading means therefor, although certain features thereof may be employed with equal advantage for other purposes.

It contemplates more especially the provision of means for oscillating the loading skip to insure the complete discharge of the contents to a mixing instrumentality.

Mixers are used to completely commingle the materials constituting the ingredients of a plastic substance usually termed concrete or mortar for construction purposes. The ingredients of this plastic material while in an unmixed stage will at times tend to cling to the interior surfaces of the skip, and with difficulty gravitates to the mixing receptacle. This is especially characteristic of rich cement mixtures which leave substantial residue. The retention thereof is highly undesirable, since the setting thereof is extremely injurious, in the sense that it hinders the flow of materials.

Numerous contrivances have heretofore been proposed for cleansing the charging skips used in connection with concrete and mortar mixers, but these are entirely too intricate and ineffective to insure complete discharge, and entail much labor in their operation to remove the entire contents of each batch therefrom. The retention of materials in the skip or other portions of the mixer permits the setting thereof, and consequently the mechanism soon becomes filled therewith to the extent of impairing the capacity and operation thereof.

One object of the present invention is to simplify the construction and improve the operation of devices of the character mentioned.

Another object is to provide means in association with a loading skip to effect the positive discharge of the contents therefrom in a predetermined position of inclination.

Still another object is to provide means for effecting the oscillation of a skip in a predetermined position to effect the total discharge of materials therefrom.

A further object is to provide means for controlling the position of a skip, and selectively effecting the automatic oscillation thereof in a predetermined position of discharge.

A still further object is to provide means in the path of a material discharging skip to effect the oscillation thereof in a predetermined position for insuring the complete discharge of the contents.

Still a further object is to provide means for controlling the position of a loading skip so as to effect the automatic descension thereof to charging position.

Other objects and advantages will appear from the following description of an illustrative embodiment of the present invention.

In the drawings:

Figure 1 is a perspective view of a device embodying features of the present invention.

Figure 2 is a side view in elevation of the device disclosed in Figure 1.

The structure selected for illustration comprises any suitable frame including, in this instance, spaced standards 10 and 11 having aligned bearings 12 secured thereto to receive a shaft 13 which is journalled therein for rotary movement in any direction. A loading skip 14 of conventional shape is provided with a bracket 15 in proximity to the discharge orifice 16 thereof to enable the rotation of the skip 14 with reference to the frame 10. The brackets 15 have a bore to receive the shaft 13 therethrough, thereby enabling the pivotal movement of the skip 14 to assume any desired inclination for effecting the reception or discharge of materials.

As shown, the skip 14 is provided with an angularly related end portion 17 which terminates in an enlarged orifice 18 for receiving materials therein to effect the feeding thereof through the discharge orifice 16 to a mixing drum (not shown). A bumper bar 19 is disposed transversely of the standards 11 for resilient mounting in the path of the charging orifice 18 of the loading skip 14 by virtue of rods 20. The rods 20 are secured to the bar 19 for projection through the standards 10 and 11. Spiral springs 21 envelope the rods 20 to exert a normal urge on the bumper bar 19 to limit the movement of the skip 14 to assume its discharging position.

In order to effect the elevation of the loading skip 14 to its discharging position, power means are provided to control the movement thereof. To this end, a shaft 22 is journalled in aligned bearings 23 superposed above the bearings 12, the shaft 22 being disposed in spaced relation with the shaft 13. Pulleys 24 are fixed to the shaft 22 beyond the standards 10 and 11 to receive a tension transmitting cord 25 which is wound thereon. The cord 25 contacts with the loading end 17 of the skip 14 for engagement with rollers 26 journalled on pins 27 fixed to the lateral walls thereof.

The shaft 22 extends considerably beyond the standard 10 to receive a pulley 28 for rotation in unison therewith. The pulley 28 is provided with a peripheral groove 29 which frictionally engages a belt 30 which is driven by a pulley 31 fixed to a horizontal shaft 32 journalled in any suitable bearings (not shown). The shaft 32 terminates in a disc clutch 33 which cooperates with a complemental clutch element 34 carried by a driving shaft 35 connected to any suitable source of power (not shown).

The clutch element 34 is provided with a grooved collar 36 rigidly fixed thereto to cooperate with furcations 37 constituting a part of an arm 38. The arm 38 is fixed to a vertically disposed rod 39 which is journalled in spaced bearings 40 fixed to the frame in any suitable manner. Intermittent movement of the rod 39 in opposite directions will effect the movement of the clutch element 34 toward or from the clutch element 33 to effect the elevation or descension of the loading skip 14 to selectively assume its discharging or charging position. The rod 39 is controlled by a lever 41 fixed thereto at the bored extremity 42 thereof. The lever 41 has a furcated extremity 43 which receives a pin 44 therethrough to pivotally engage the extremity of a horizontally disposed actuator rod 45. The actuator rod 45 has the extremity 46 thereof pivoted to a lever 47 intermediate the ends thereof, the lever 47 being pivoted to a fixed lug 48. The manual manipulation of the lever 47 operates the clutch element 34 to effect the elevation or descension of the skip 14 depending on the position of the lever 47.

With the movement of the lever 47 to assume an extreme position (Figure 1), the clutch element 34 engages the disc 33 to effect the driving of the shaft 22 in a counterclockwise direction (viewed from Figure 2) to wind the cord 25 on the pulleys 24, thereby elevating the loading skip to its discharging position against the bumper bar 19 to effect the charging of the mixing drum (not shown).

Means are provided to effect the release of the skip 14 upon the discharge of the contents therefrom. This is accomplished by a lever 49 disposed vertically for guidance in spaced bearings 50 and 51 which terminate in brackets 52 fixed to the standard 11. The lever 49 terminates in a furcated arm 53 which receives a pin 54 through the furcations thereof to engage the clutch operating rod 45. The other extremity of the lever 45 terminates in a laterally projecting arm 55 which is disposed in the path of the skip 14 to effect the engagement thereof during its approach of the bumper 19. The skip in its movement imparts a turning couple to the arm 55 of the rod 49 which effects the retraction of the rod 49 to cause the clutch element 34 to recede from frictional contact with the disc 33. This effects the release of the skip to enable the gravitation thereof to its charging or loading position.

The materials contained in the loading skip 14 are of a plastic nature owing to the commingling of cement, gravel, and water. As a consequence, there is considerable adhesion between the material and the walls of the skip. To avoid the retention of any portion thereof within the skip, oscillatory movement is imparted thereto while in the discharging range. To this end, a rod 56 slidably projects through a bearing 57 secured to a standard 58 constituting a part of the frame. The rod 56 is provided with a spiral spring 59 which envelopes a portion thereof for confinement thereon by a lug 60 fixed to the extremity thereof.

As a consequence, the spring 59 urges the rod 56 in an extreme position, and a lug 61 provided thereon engages the lever 47 to normally maintain the clutch element 34 in operative engagement with its disc 33 to elevate and maintain the loading skip 14 in its discharging position. With its arrival at the discharging position in contact with the bumper 19, the arm 55 is turned owing to the movement of the skip 14 thereagainst to impart corresponding movement to the rod 49 for retracting the clutch operating rod 45. This releases the driven shaft 32 from the driving shaft 35, thereby causing the skip to descend momentarily. With the descension of the skip, the spring 59 retracts the rod 56 having the lug 61 in engagement with the lever 47 to restablish the driving connection between the shafts 35 and 32, thereby elevating the drum in contact with the bumper 19. As a consequence, these instrumentalities function to automatically oscillate the skip 14 until the contents are completely discharged. Thereafter the lever 47 is disengaged from the lug 61 which may be adjustably secured to the rod 56 to vary the extent of oscillation.

The attendant then withdraws the lever 47, and the skip 14 descends to receive more material. With the arrangement above described it will be apparent that novel means have been provided to provide oscillatory movement to the skip 14 within the range of discharge, thereby loosening all the material to the extent of precluding the retention thereof owing to their adhesive characteristics. Obviously, other expedients may be employed to control the skip in that the release mechanism may be associated with the bumper instrumentality 19 with a view of accomplishing the same result.

Various changes may be made in the embodiment of the invention herein specifically described without departing from or sacrificing any of the advantages thereof as defined in the appended claim.

I claim:

In a loading skip, a frame, a shaft thereacross, a skip upon said shaft and having a body to receive materials and a discharge spout, the latter normally being upturned, a bumper bar, a spring support in said frame for said bumper bar, means for lifting said skip rotatably about said shaft and to cause the material of the skip body to approach said bumper bar, a prime mover, a clutch intermediate said prime mover and said lifting means, a manually controlled operating lever actuating said clutch, a locking member for said lever and having resilient holding means therefor and a release lever in the path of the spout of said skip to retract said clutch operating lever.

HAROLD R. McDERMOTT.